June 17, 1947. G. N. KNAPP 2,422,355
AUTOMATIC RAILROAD CAR COUPLER
Filed July 2, 1945 3 Sheets-Sheet 3
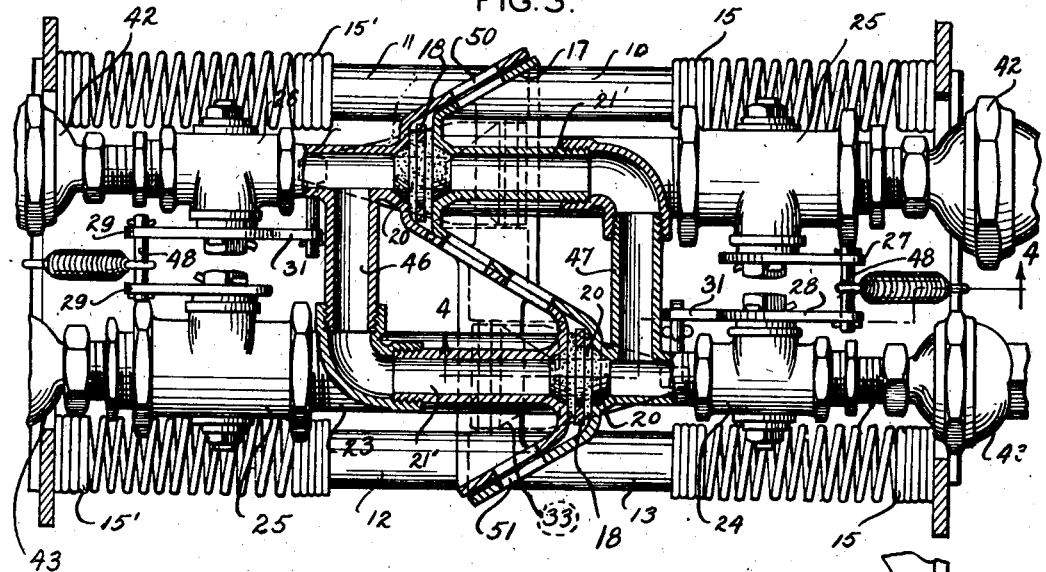
FIG. 3.
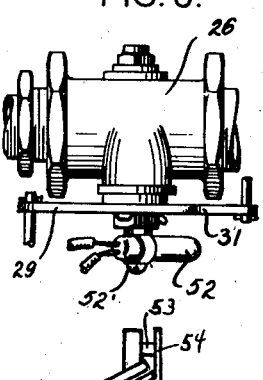
FIG. 6.
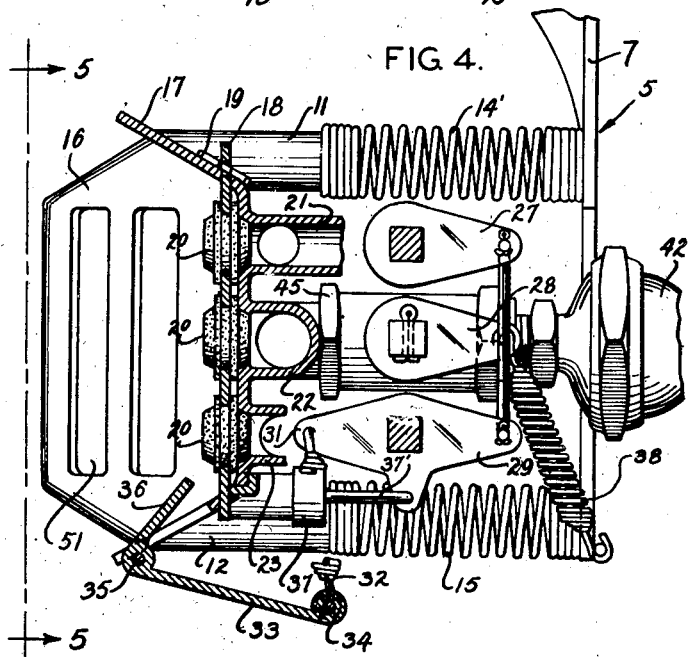
FIG. 4.
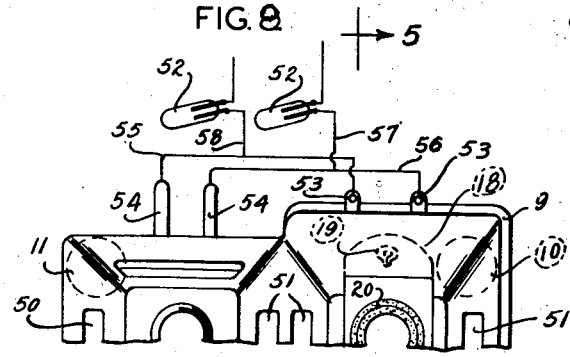
FIG. 7.
FIG. 8.
INVENTOR:
GEORGE N. KNAPP
BY
ATTORNEY Patented June 17, 1947

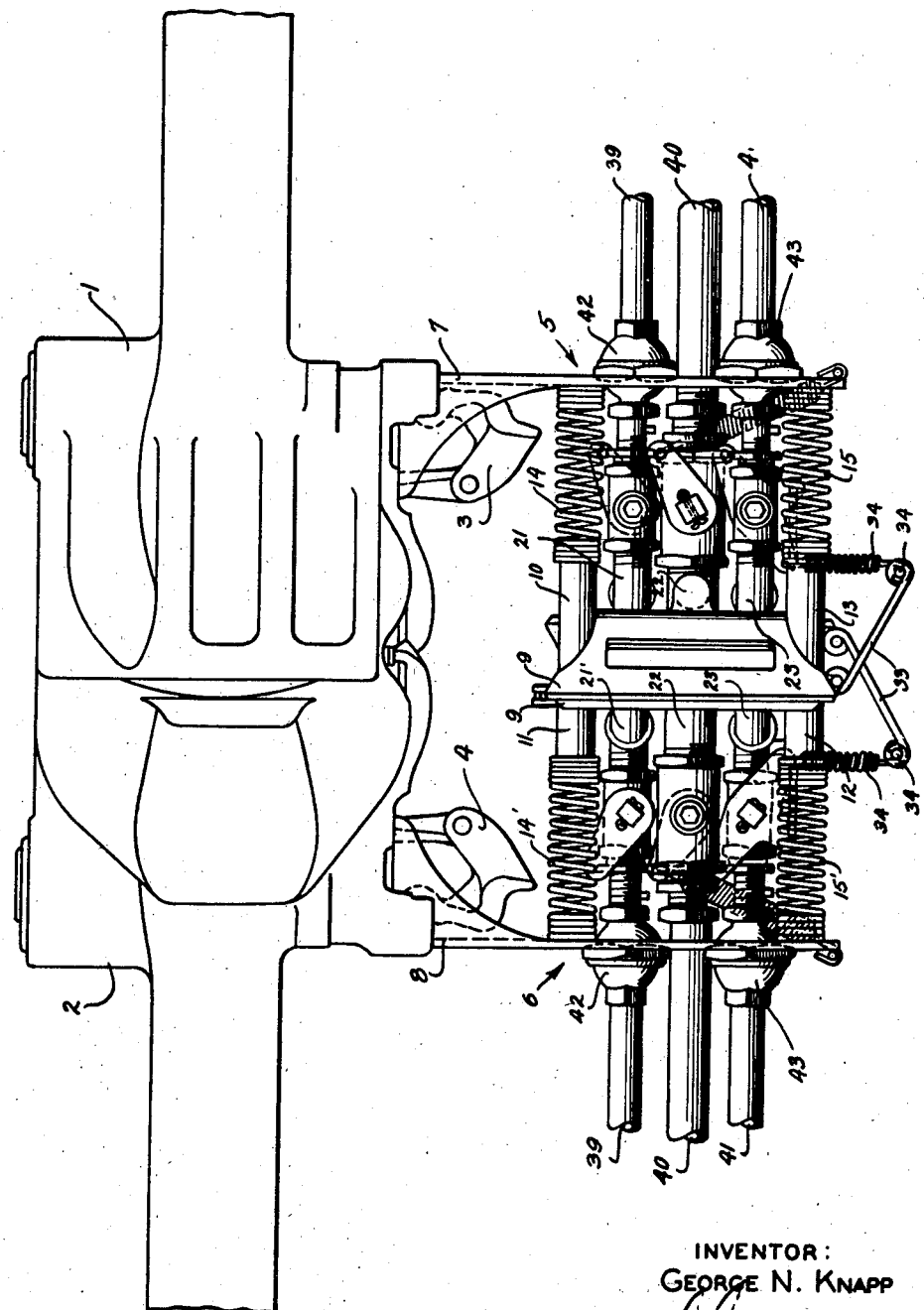

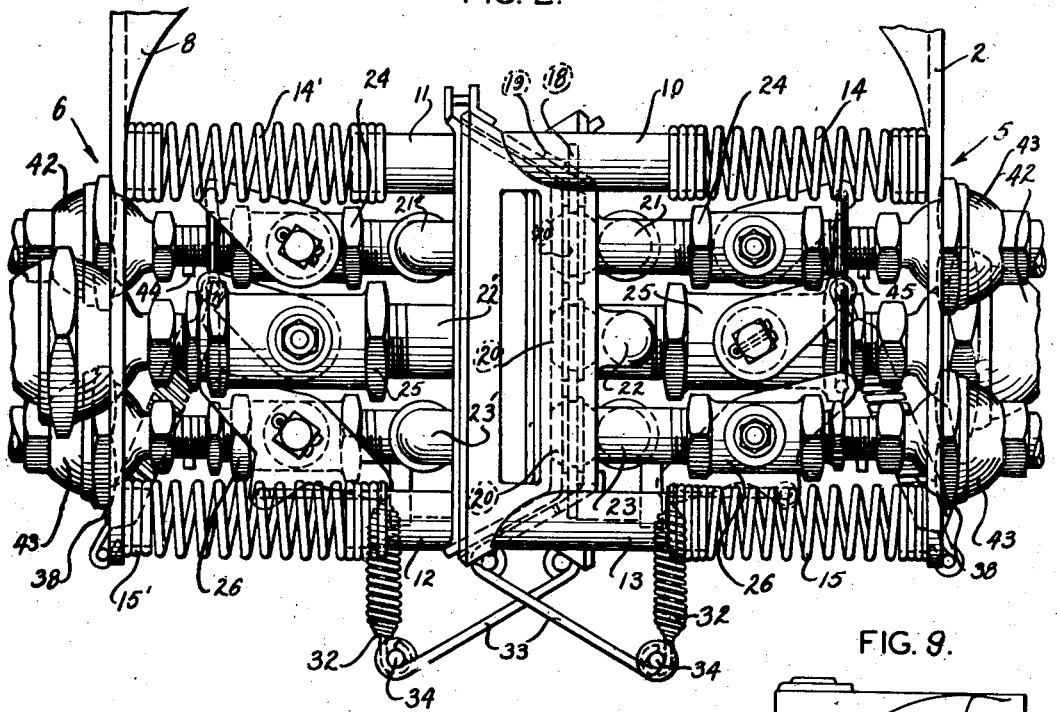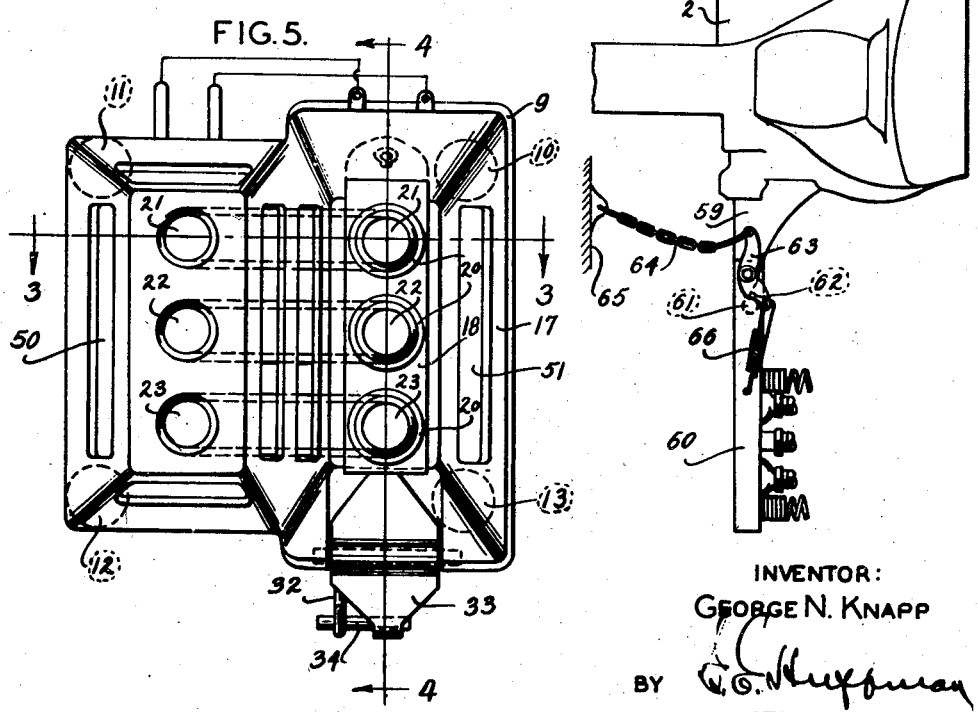

2,422,355

UNITED STATES PATENT OFFICE 2,422,355

AUTOMATIC RAILROAD CAR COUPLER

George N. Knapp, Pine Lawn, Mo.

Application July 2, 1945, Serial No. 602,771

12 Claims. (Cl. 284—6)

This invention relates to railroad car equipment and in its more specific aspects is directed to an attachment for draft couplers whereby air lines or other power conducting means are connected to succeeding cars at substantially the same instant that the car draft coupler is engaged.

The object of this invention is to provide an attachment for car draft couplers which will simultaneously connect air conducting and other conduits at the same time that the draft couplers are engaged.

Another object of the invention is to provide means in a coupler attachment securable to the drawbar couplers operable to open and close valves in the conduits which conduct air or other fluids from one car to another after the drawbar couplers have been engaged.

Still another object of the invention is to so associate the air line and other conduits in a coupler with the drawbar couplers in such a manner that jackknifing of the airline and other conduit couplers will not occur when the drawbar couplers by-pass.

Another and further object of the invention is to provide a coupler attachment securable to the drawbar couplers to connect the air lines and other conduits as well as electrical connections between cars including mechanism for closing the electrical circuit and opening the air line valve and the valves in the other conduits after the drawbar couplers close.

Other and further objects of the invention will occur to those skilled in the art to which this invention pertains as the description proceeds, which, taken in connection with the accompanying drawings, sets forth a preferred embodiment of the invention and selected modifications thereof but such disclosures are not to be construed as a limitation of the invention which is limited only by the appended claims, and any and all modifications, alterations and variations of structure coming within the spirit and scope thereof are deemed to be included herein.

In the drawings:

Figure 1 shows an elevational view of the coupler associated with the drawbar coupler;

Figure 2 shows an enlarged elevational view of the improved coupler;

Figure 3 is a sectional view taken substantially along the line 3—3 of Figure 5;

Figure 4 is a detail view taken substantially along the line 4—4 of Figure 3;

Figure 5 is an end view of the coupler construction looking in the direction of line 5—5 of Figure 4;

Figure 6 shows a detail view showing the switch mounting;

Figure 7 shows a detail view of the mounting of contacts;

Figure 8 shows a detail view of the mounting of contacts and the circuit therefor; and Figure 9 shows a modified detail view of a safety release for the conduit coupler.

Various expedients have been employed in the railroad art to connect air and other conduits simultaneously with the engagement of the drawbar couplers. These expedients have involved attachments carried on or by the railroad car and while reasonably expedient for the connection of air lines, they have been found unreliable because of the liability of damage to parts in the event of by-passing of the drawbar couplers. This invention is directed to mechanism intended to couple simultaneously with the engagement of the drawbar couplers so that whatever motion or action is applied to the drawbar couplers will be applied to the conduit couplers attached thereto to effect a connection of the several conduits normally carried by railroad cars.

The above objects and advantages are obtained in the structure set forth in the accompanying drawings in which numerals 1 and 2 refer to drawbar couplers of connecting cars which are operated by the customary pin controls 3 and 4 for releasing and locking the drawbar couplers. These couplers are conventional in the art and no detailed description thereof is believed necessary. Suspended from each of the drawbar couplers 1 and 2 are auxiliary coupling means 5 and 6 supported from the drawbar coupler by brackets 7 and 8, the latter being secured thereto in any convenient manner. Each of the coupler elements 5 and 6 is identical in construction and the description of one will necessarily apply to the other.

The coupling member secured to brackets 7 and 8 originates in a dual frusto-pyramidal face member 9 whose general contour is the same as that of the drawbar couplers 1 and 2. Secured to the corners of member 9 are pin elements 10, 11, 12, and 13. Members 10 through 13 constitute supports for spring elements 14 and 15 with two other springs 14' and 15' associated with the rear supports 11 and 12 but shown in full on coupler 6, said coupler being complemental to coupler 5. The opposite ends of springs 14 and 15 and their complemental members 14' and 15' are seated against bracket 7 on suitable retaining elements to prevent the displacement of the springs on bracket 7. These retaining means may be on the order of those shown in prior United States Patents 1,378,468, May 17, 1921, or 1,737,750, January 6, 1931. Secured to dual frusto-pyramidal member 9 at the base of each of its portions 16 and 17 is a removable member 18 which is held in said base by a retaining member 19. Member 18 has a plurality of apertures therein in each of which a gasket 20 is arranged, there being one gasket for each of the connecting conduits such as 21, 22, and 23 intended to conduct compressed air, water, and steam or any other fluid under pressure that may be found necessary. Associated with each of the conduits are valves 24, 25, and 26. These valves are actuated by levers 27, 28, and 29 and the free ends of each of the levers are connected for joint operation by means of a lever or rod 30. One of the arms 29, for example, has a lever 31 extended rearwardly to which a strong spring 32 is connected whose other end is connected to a lever 33 by means of a pin 34, lever 33 being pivoted to portion 17 of coupler head or portion 9.

Lever 33 is pivoted to the coupler head by a pin 35 with an arm 36 extending into the conical cavity formed in the coupler head 9. Upon engagement of the couplers, lever 36 is depressed, thereby rotating levers 31 and 29 through spring 32 and simultaneously moving the several valves from closed to open position. In order to prevent a rapid opening or closing of valves 24, 25, and 26, a retarding element 37 is attached to the coupler head which functions in the manner of a door-check and has a piston rod 37' operatively associated with lever 29. Spring 38, which is weaker than spring 32, is operatively connected to lever 28 to restore the valve to closed position when the coupler attachment for compressed air and other fluid is uncoupled, the other end of the spring being secured to a suitable fixed member. Connected with the several valves are conduits 39, 40, and 41 having universal joints 42 and 43 therein to allow relative motion between the conduit rigidly supported on the body of the car and the movable coupler element. The joints 42 and 43 are well-known constructions in the art to conduct pressure fluid in any angular position of the several conduits 39, 40, and 41 with respect to valves 24, 25, and 26. A second set of conduits 21', 22', and 23' is associated with the convex portion of the coupler head which has valves 24, 25, and 26 associated with the respective conduit lines, all similarly numbered lines being connected together through the coupler. The same removable gaskets 20 and holder 18 are associated with these several conduits. The interconnection provided between the similarly numbered conduits carrying similar fluids comprises cross-conduits 46 and 47, there being suitable fittings provided to make the necessary cross-connection. The valves in each set of conduits on each coupler are connected together in order to operate jointly. This is accomplished by means of a cross-member 48 which connects levers 27, 28, and 29 on each set of valves 24, 25, and 26 disposed opposite each other so that any motion applied to one set will also be applied to the other set by means of the previously described construction.

The coupler head 9 and its complemental convex and concave portions 16 and 17, as indicated above, are coupled on the same vertical center line as the drawbar couplers 1 and 2. In order to insure a tight fitting arrangement between the conduits in each of the coupler heads, gaskets 20 have been provided. Leakage is prevented at the coupling point by these gaskets. The several springs 14, 14', 15 and 15' are compressed upon coupling to urge the several conduits in each of the coupler heads into a tight fitting relationship. Upon uncoupling, these springs urge the coupler heads outwardly so that the coupler heads will be aligned with the drawbar coupler head and ready for the next coupling action. The axial motion of the coupler head 9 is only a fraction of an inch to avoid extending same excessively beyond the face of the drawbar couplers 1 and 2. Since couplers 5 and 6 are rigidly secured to the drawbar couplers 1 and 2, any motion of the drawbar couplers will be imposed upon the air line and other conduit couplers. Any tendency of the drawbar couplers to slide past each other or bypass will cause the conduit couplers to do the same, thereby avoiding any damage, by reason of jackknifing, to the air line coupler and its associated parts.

The cooperating faces of the coupler head 9 have apertures 50 and 51 formed in each face of the frusto-pyramidal elements 16 and 17 to dislodge any grit or other foreign matter from the coupler before the conduits are brought into engagement one with the other. Means, such as valves 44 and 45 (Figure 2), may be provided in the several conduits to allow any grit or foreign matter to be exhausted therefrom when there is no pressure in the several lines, the valves being held closed when there is pressure in them.

The mechanism for operating the several valves 24, 25, and 26 and their complemental valves simultaneously actuates a mercury swtich 52 associated therewith and is opened during any uncoupling and is closed during coupling engagement when the several valves have been opened by reason of the action of levers 33, 36 and springs 32, 38 on the several valves. The switch is mounted on an extension 52' secured to a stem of one of valves 24, 25, and 26 and each of couplers 5 and 6 has its switch mounted thereon. Being open at all times on an uncoupled car, the switch enables anyone to handle the coupler without damage or shock and insures the positive connection of any electric power lines which may be associated with the coupler element. There are as many switches as there are electrical conductors and the action of each is identical. Element 37 retards the action of switch 52 because it is directly connected to the stem of one of the valves 24, 25, or 26 as shown in Figure 6. Since element 37 retards the actuation of the valves, it must necessarily retard the actuation of switch 52 directly connected to one of them.

The electrical circuits are connected through the couplers 5 and 6 by having one or more fixed contacts 53 fixed preferably to the male element of the pyramidal coupler head and a corresponding number of flexible contacts 54, fixed to the female element of the pyramidal coupler head. Each head is similarly equipped and each set of contacts is cross-connected by means of conductors 55 and 56. Conductors 57 and 58 are connected to each of conductors 55 and 56 and include switch 52, there being one switch for each individual circuit. Conductors 57 and 58 are associated with the car.

The operation of couplers 5 and 6, as indicated above, is substantially simultaneous with the draft couplers 1 and 2. The couplers 5 and 6 are so related that the complemental frusto-pyramidal sections of the head 9 will engage with the same formations on the cooperating head by reason of the fact that one face of the head is convex and the other is concave, the complemental parts interfitting. The frusto-pyramidal sections align couplers 5 and 6 so that each of the conduits 21, 22, and 23 will be aligned when the heads 9 are brought together. The several conduits of each complemental head engage the gaskets 20 prior to the complete engagement of the draft couplers 1 and 2 so that when they are coupled, springs 14, 14', 15 and 15' will then go under compression to seal the conduit connection, thereby placing the conduit connections under spring pressure and still allowing a small amount of relative movement between the coupler sections.

When the coupler heads 9 are in engagement, lever 36 will be depressed, tensioning spring 32, causing it to open valves 24, 25, and 26, and closing switches 52. The rate of opening of the valves and the closure of switches 52 is regulated by check mechanism 37 and upon uncoupling, spring 38 will reverse the motion described above. The check mechanism 37 prevents the opening of valves 24, 25, and 26 prior to the sealing of the several conduit connections, thereby avoiding the loss of fluid in the several conduits. It is apparent, therefore, that the several circuits, both pressure fluid and electrical, are regulated by the same mechanism making manual conduit and electrical connections unnecessary. Being rigidly connected to draft couplers 1 and 2, couplers 5 and 6 will have the same movement and springs 14, 14', 15 and 15' will maintain the seal regardless of movement of couplers 1 and 2 relatively to couplers 5 and 6.

Figure 1 shows couplers 5 and 6 as dropped a little below the heads of couplers 1 and 2, this being done to illustrate the pin operating elements 3 and 4 more clearly. Commercial practice will allow couplers 5 and 6 to be elevated somewhat because elements 3 and 4 will operate between springs 14 and 14'. The only limitation on the spacing is the lever operating elements 3 and 4.

Figure 9 shows a safety device which allows coupler 6, only a portion of which is shown, to become detached from drawbar coupler 2 in the event breakage should occur in coupler 2. The bracket 8 is shown divided with part 59 secured to the head of coupler 2. Bracket 60 supports the spring and conduit devices on coupler 6 and has a pin or projection 61 which is received in a slot 62 in part 59. A latch 63 pivoted to bracket 60 aids in keeping pin 61 in place and to insure removal from the path of possible movement of the pin 61, a chain 64 is connected between latch 63 and sill 65 of the car. Upon breakage of coupler 2 relative movement of the couplers will cause them to separate by withdrawal of pin 61 from slot 62. Chain 64, which is secured to the car sill represented by the line representing a fixed sill member, will also prevent coupler 6 from dropping to the ground, thereby preventing damage to it and the associated parts. A spring 66 may be employed to keep the latch in the position illustrated. Each leg of each bracket is similarly constructed.

Having fully described my invention, that which I claim as novel and desire to protect by Letters Patent of the United States:

1. An automatic coupler comprising a pair of complemental coupler heads; a plurality of conduits associated with said coupler heads; and removable gasket means in said heads associated with said conduits, the walls of said coupler heads having apertures therein through which grit and foreign matter may be ejected before engagement of said conduits with said gasket means.

2. An automatic coupler comprising a pair of complemental coupler heads having complemental convex and concave frusto-pyramidal surfaces intended to align said heads during coupling; fluid conducting means associated with each of said heads; spring means energizable upon the coupling and uncoupling of said heads to open and close said fluid and power conducting means; and means to delay the operation of said last mentioned means until said heads have been coupler or uncoupled.

3. An automatic coupler comprising a pair of coupler heads having means therein to connect fluid conducting conduits; means to regulate fluid flow through said conduits; means to detachably secure each of said coupler heads to a draft coupler; and latch means permitting the detachment of said coupler heads from the supporting draft couplers when the latter break or unintentionally separate including means to suspend said coupler heads from the vehicle to which they are attached.

4. An automatic coupler comprising a head; conduit means associated with said head; valve means in said conduit means; a lever pivotally mounted in said head operated by a complemental head engaging said lever; means connecting said lever with said valve means to actuate same including a spring energized when said lever is operated; and means retarding the actuation of said valve means to enable said complemental head to engage said lever before said valve means is actuated.

5. An automatic coupler comprising a head; fluid conducting means associated with said head; means to resiliently support said head on a draft coupler; a valve in said fluid conducting means; a lever pivotally mounted in said head actuated when said head is engaged by a complemental head; a spring connecting said lever and said valve means energized when said lever is actuated, said spring actuating said valve; and means to delay the actuation of said valve until said head is engaged by said complemental head, said spring actuating said valve after said heads have been engaged.

6. An automatic coupler comprising a pair of complemental coupler heads in substantial alignment with the drawbar coupler heads; conduits associated with said coupler heads; a valve associated with each of said conduits; operating means connected to each of said valves; a spring energizable upon the engagement of said coupler heads to jointly operate each of said operating means; a delayed action mechanism to regulate the operation of said valves; a bracket secured to said drawbar coupler heads; and a plurality of resilient means disposed between each of said coupler heads and said bracket to permit relative movement between said coupler heads.

7. An automatic coupler comprising a pair of coupler heads whose contour is substantially that of the drawbar couplers; conduit means associated with each of said coupler heads; valve means associated with each of said conduits; means to jointly operate said valves; resilient means energizable upon the coupling and uncoupling of said heads to open and close said valves; and means to retard the opening and closing of said valves until after said coupler heads have been coupled and uncoupled.

8. An automatic coupler for connecting fluid and other circuits between cars, comprising a pair of coupler heads; means to suspend said heads from the drawbar coupler heads including a plurality of resilient elements; means to open and close said circuits; spring means operable upon the engagement of said coupler heads to operate said means; and means to delay the opening and closing of said circuits until after the coupling and uncoupling action is complete.

9. An automatic coupler for connecting pressure fluid and other circuits, comprising a pair of heads, each having complemental concave and convex frusto-pyramidal portions; means to suspend said heads from the drawbar coupler heads including a plurality of resilient elements; fluid and other power conducting means connected to each of said portions; means to open and close said fluid and power conducting means; spring means operable upon the coupling and uncoupling of said heads to operate said last mentioned means; and means to delay the operation of said control means until the coupling or uncoupling action is complete.

10. In an automatic coupler, a head; means to resiliently support said head from a draft coupler; fluid and power conducting circuits connected to said head; means to control the flow of fluid and power through said conducting circuits; a lever pivotally mounted on said head; resilient means connecting said lever and said last mentioned means, said resilient means energized when said head is engaged by a complemental head, said resilient means actuating said means to control said circuits after said lever has been actuated; mechanism to delay the actuation of said means to regulate said circuits until after said lever is actuated; and other resilient means to reversely actuate said means to control said circuits after said head has been disengaged by said complemental head, said mechanism acting to delay said means to control said circuits until after said head has been disengaged by said complemental head.

11. An automatic coupler for the transmission of pressure fluid from one car to another comprising a pair of coupler heads; resilient means to permit relative motion of said coupler heads; a conduit associated with one coupler head connectable with a conduit in the other coupler head; a valve associated with at least one of said conduits; and a spring energizable upon engagement of said coupler heads to operate said valve.

12. An automatic coupler for the transmission of a pressure fluid from one car to another comprising a pair of coupler heads; resilient means to permit relative motion of said coupler heads; a conduit associated with one coupler head connectable with a conduit in the other coupler head; a valve associated with at least one of said conduits; a spring energizable upon engagement of said coupler heads to operate said valve; another spring energizable upon disengagement of said coupler heads to operate said valve; and means to delay the actuation of said valve until the coupling or uncoupling action is completed.

GEORGE N. KNAPP.

REFERENCES CITED

The following references are of record in the file of this patent:

UNITED STATES PATENTS

| Number | Name | Date |
| --- | --- | --- |
| 1,805,646 | Thomas | May 19, 1931 |
| 1,808,255 | Robinson | June 2, 1931 |
| 1,130,252 | Bookwalter | Mar. 1, 1915 |
| 2,099,490 | Larsson | Nov. 16, 1937 |